Nov. 13, 1928.
W. G. MYLIUS
1,691,357
ELECTRICAL MEASURING INSTRUMENT
Filed Aug. 20, 1924
4 Sheets-Sheet 3
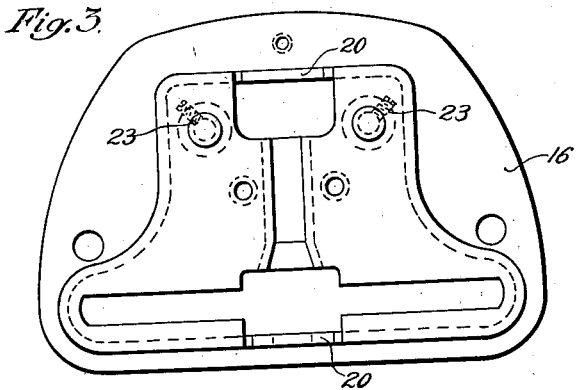
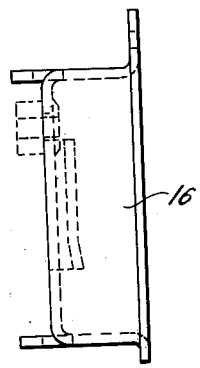
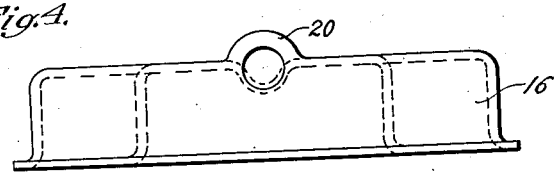
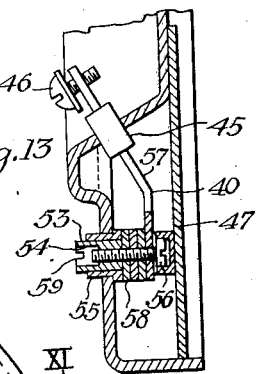
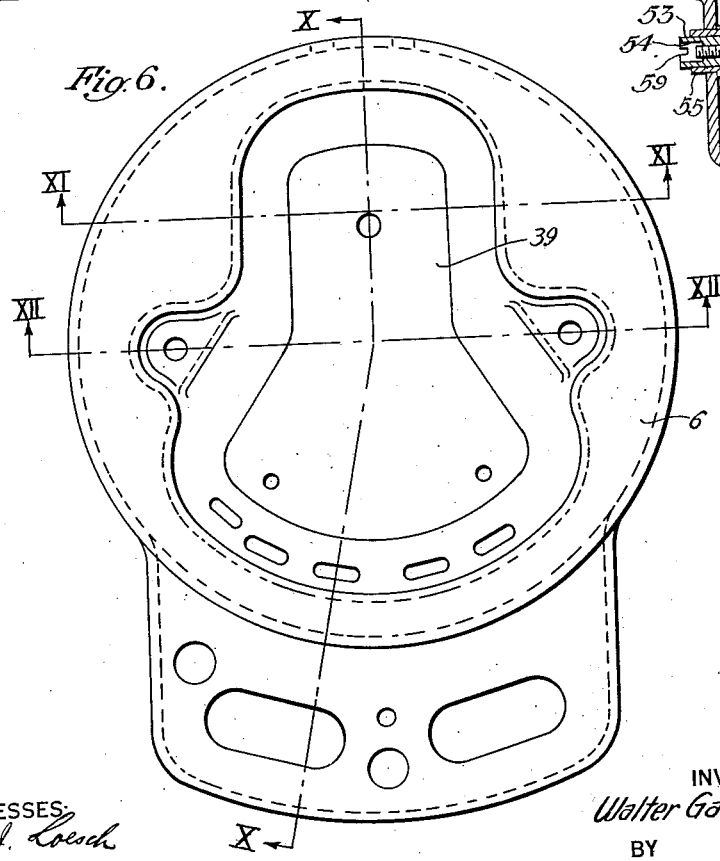
INVENTOR
Walter Garfield Mylius
BY
ATTORNEY
WITNESSES Nov. 13, 1928.  W. G. MYLIUS  1,691,357
ELECTRICAL MEASURING INSTRUMENT
Filed Aug. 20, 1924    4 Sheets-Sheet 4
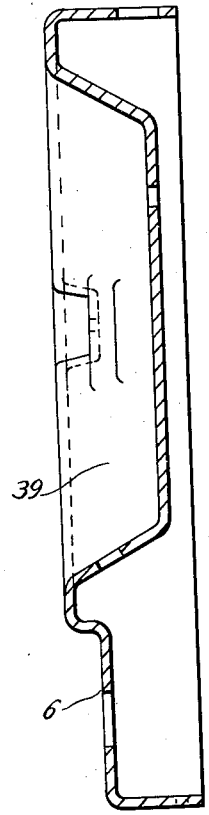
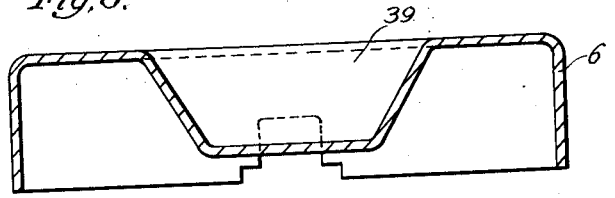
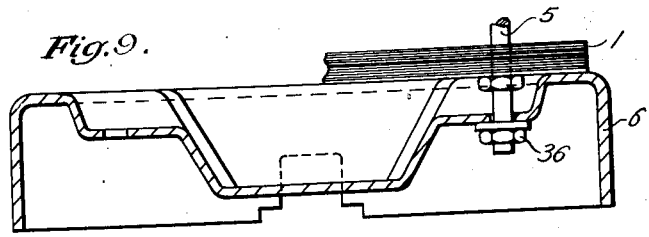
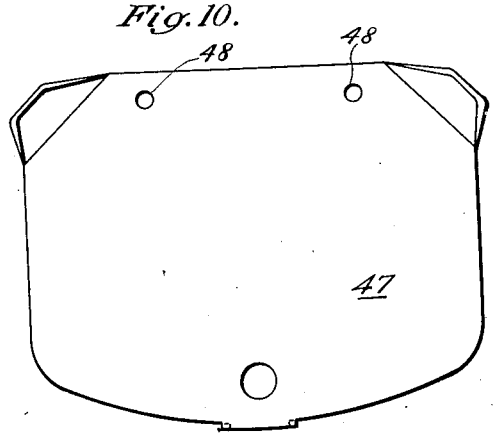
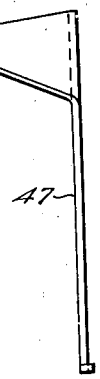
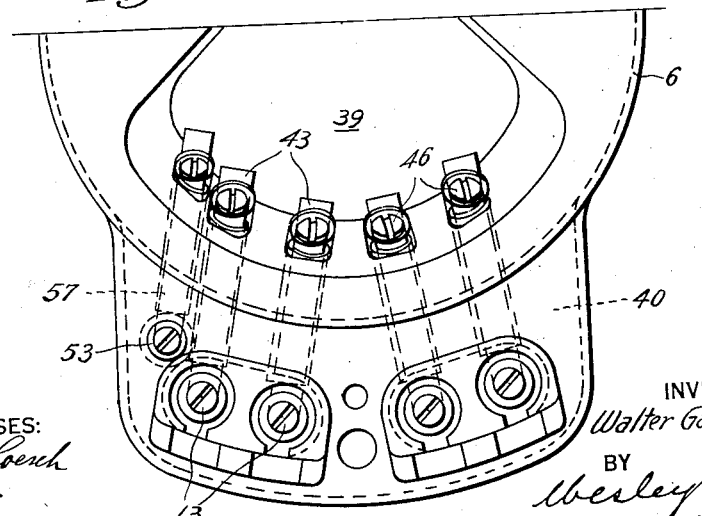
INVENTOR
Walter Garfield Mylius
BY
Wesley G. Carr
ATTORNEY
WITNESSES:

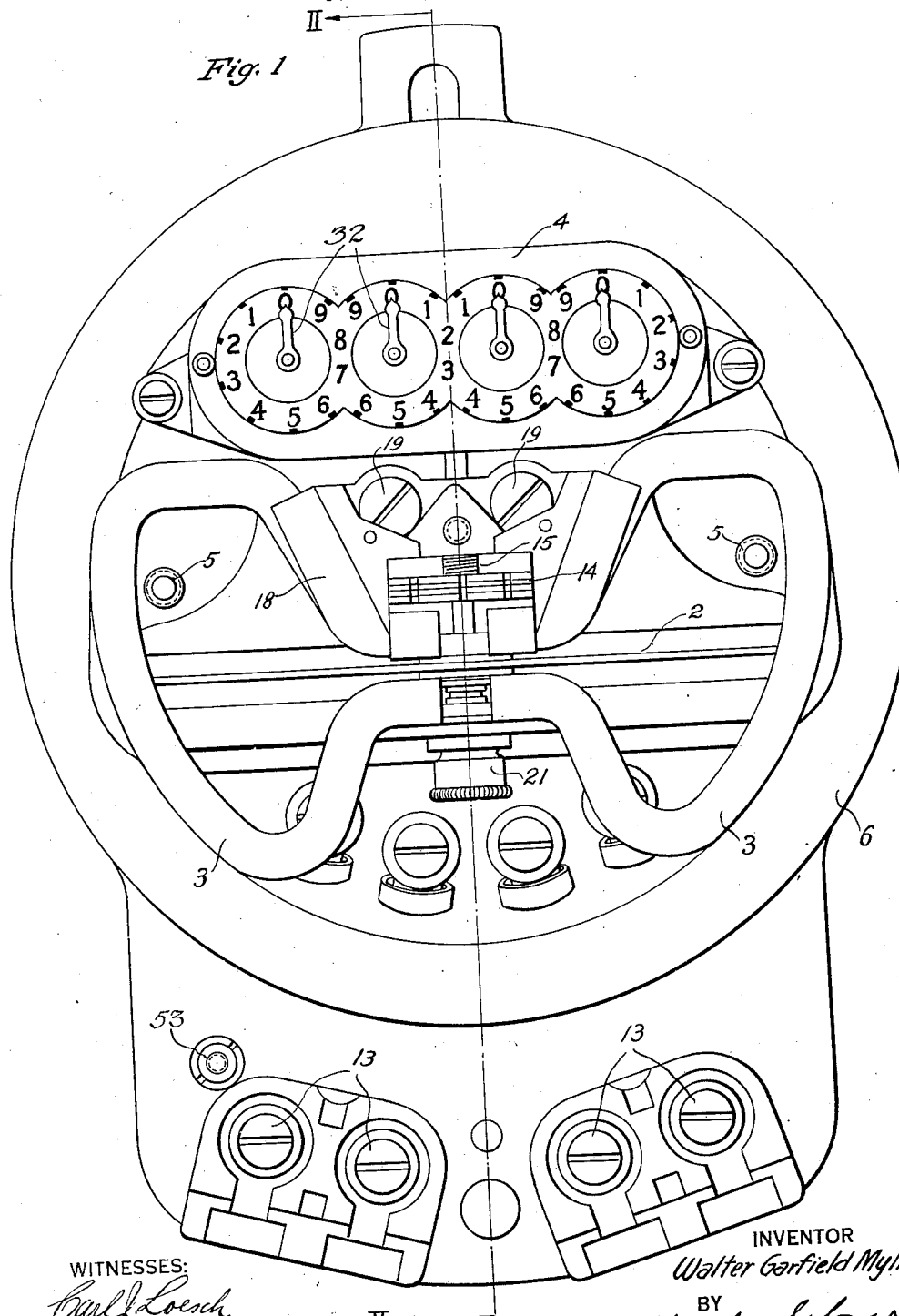

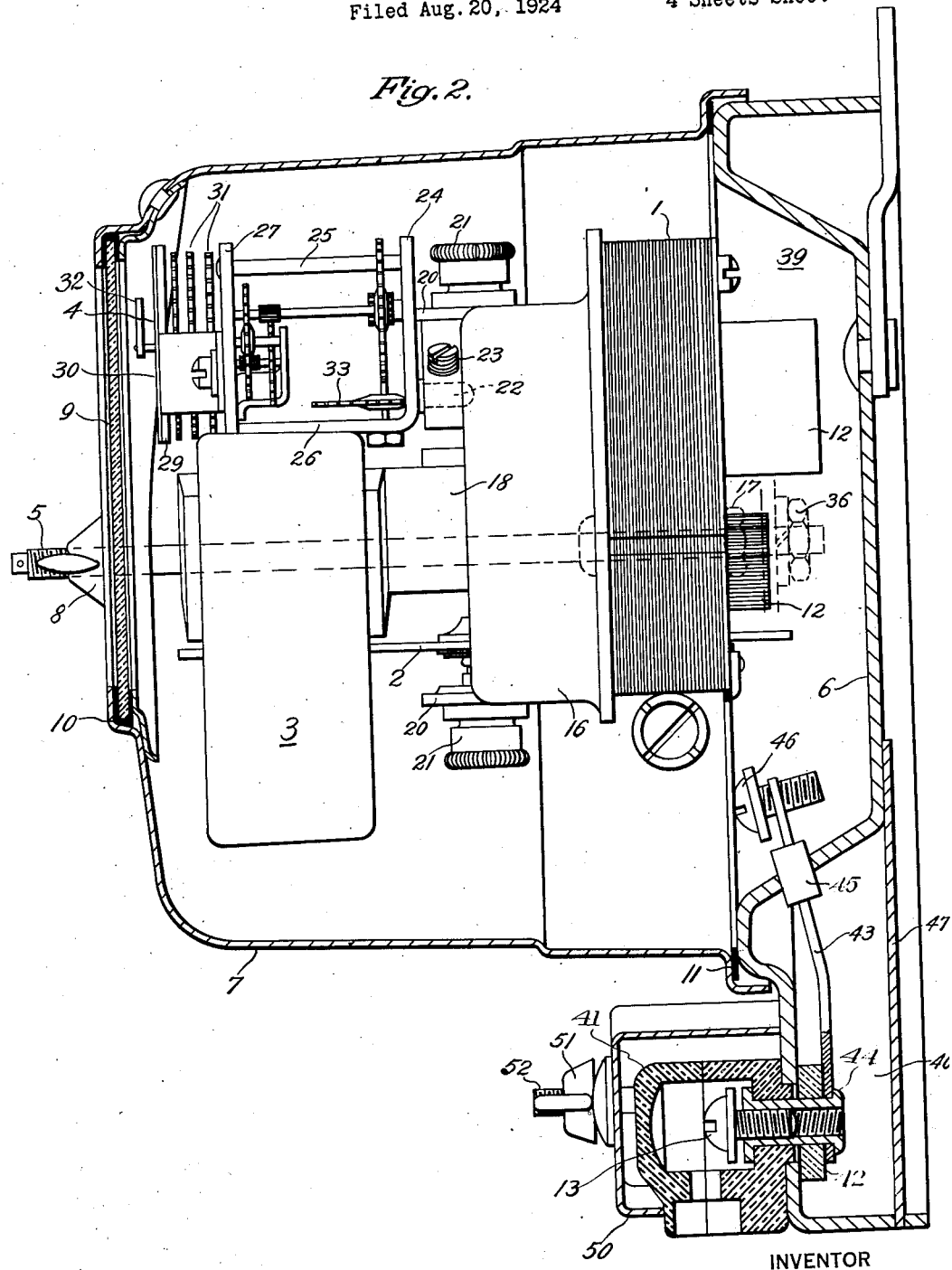

Patented Nov. 13, 1928.

1,691,357

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 20, 1924. Serial No. 733,044.

My invention relates to electrical measuring instruments and particularly to watthour meters of the induction type, although certain features thereof are susceptible of general application.

In general terms, the object of my invention is to improve and simplify the construction of instruments of the above indicated character.

Another object of my invention is to provide an instrument of the above indicated character that shall have an electro-magnet, a rotatable disc controlled by the electro-magnet, and a register connected to the disc, the electro-magnet, disc and register being supported upon a single support that serves to maintain the elements permanently in proper relation to each other.

Another object of my invention is to provide an integrating meter that shall have a rotating element, an electro-magnet and a permanent magnet controlling the rotation of said element, and a magnetic shield between the permanent magnet and the electro-magnet that serves to support the electro-magnet, the permanent magnet and the disc.

Another object of my invention is to provide an inverted cup-shaped base for a watt-hour meter or the like having a substantial depression in the top thereof in order to provide a strong and rigid construction.

Another object of my invention is to provide a pressed-metal base for electrical instruments that shall have a terminal chamber separated from the elements of the instrument by an integral flange, thereby rendering the casing dust-proof.

Another object of my invention is to provide an electrical instrument having terminals on the base that are insulated therefrom, the ends of the terminals being spun over the terminal leads, thereby permanently securing the terminals, leads and insulating bushings in assembled relation.

Another object of my invention is to provide an electrical instrument having terminals projecting through the base thereof and a cover plate for covering the inner ends of the terminals.

Another object of my invention is to provide an electrical instrument having a base provided with projecting posts or studs to secure the elements of the instrument to the base and also to secure the removable cover on the base.

Another object of my invention is to provide a watthour meter with an improved register for registering the rotations of the motor element thereof.

In the accompanying drawings, I have illustrated a preferred embodiment of the invention.

Figure 1 is a face view of a single-phase, watthour meter of the induction type, with the cover removed;

Fig. 2 is a view in vertical section taken on the line II—II of Fig. 1;

Figs. 3, 4 and 5 are detail views of the magnetic shield and support for the magnets, rotating disc and register;

Fig. 6 is a plan view of the base of the instrument, with the meter elements and the terminals removed;

Fig. 7 is a vertical section on the line VII—VII of Fig. 6.

Figs. 8 and 9 are sectional views taken on the lines XI—XI and XII—XII, respectively, of Fig. 6;

Figs. 10 and 11 are detail views of the rear closure plate for the terminal chamber;

Fig. 12 is a plan view of the terminals and strap leads projecting through the base of the meter;

Fig. 13, is a sectional view of the terminal chamber and the test terminal.

The single-phase induction watthour meter shown in the drawings comprises a magnetizable core member 1, a rotatable disc armature 2 co-operating with said core member, permanent magnets 3 adjacent the disc 2 to effect a counter-torque thereon and a register 4 for recording the number of revolutions of the disc 2. The meter elements are secured by two studs 5 to a base 6, and an inclosing cover 7 is secured to the base 6 by wing nuts 8 upon said terminal studs. The cover 7 is provided with a transparent window 9 in front of the register 4 so that the registration of the meter may be observed.

The casing of the meter is rendered dust-proof by the interposition of gaskets 10 and 11 between the window, the cover and the base and by the use of washers engaging the studs 5 where these studs project through the cover.

The core member 1 is energized in the usual manner by series and shunt windings 12 connected to the terminals 13. It will be understood that the core member 1 is energized in accordance with the flow of energy in an associated circuit so that the disc 2 rotates in proportion to the load consumed in said circuit. The rotations of the disc 2 are recorded upon the register 4, so that the registration thereof indicates the energy utilized in the associated circuit.

In order to insure that the rate of rotation of the disc 2 shall be exactly proportional to the power consumed in said circuit over a wide range of load, the retarding effect of the permanent magnets 3 upon the disc 2 may be varied by altering the position of the adjustable magnetizable shunt 14 (see Fig. 1). The shunt 14 has a threaded shank 15 engaging the frame of the meter. Upon rotating the shunt 14, the position thereof with respect to the ends of the permanent magnets 3 adjacent the disc 2 is changed, and the retarding effect of the permanent magnets upon the disc 2 is varied accordingly.

A pressed-steel plate 16 is interposed between the core member 1 and the permanent magnets 3 and serves as a magnetic shield to prevent the electro-magnet from affecting the permanent magnets. As shown in Fig. 2, the laminated core member 1 and the shield 16 are secured together by threaded nuts 17 upon the cover studs 5. The permanent magnets 3 are also secured to the magnetic shield 16, being fastened to the bracket 18 which is, in turn, secured to the member 16 by means of two screws 19 (see Fig. 1). The shield 16 has two projecting lugs 20 carrying bearings 21 in which the disc 2 is pivoted. The register 4 is also supported by the shield 16, the frame of the register having two projecting pins or lugs 22 (see Figs. 2 and 3) adapted to engage holes in the member 16. The register is secured in position by the set-screws 23 engaging the pins 22, as shown in Figs. 2 and 3.

As shown in Figs. 1-2, the register and the gear train are mounted in a U-shaped bracket 24 having integral upper and lower portions 25 and 26. The pins 22 are riveted, or otherwise secured, to the main portion of the member 24. The supporting member 24 is attached to a plate 27 at the points 28. The plate 27 has a spaced front plate 29 secured thereto carrying the dial plate 30. Between the plates 27 and 29 are the driving gears 31 for the register pointers 32. The U-shaped construction of the supporting member 24 is so strong and rigid that the dial plate 30 and the gears 31 may be carried directly on said supporting member instead of requiring the usual separate connection to the main frame of the meter.

The driving gear 33 of the register is adapted to engage a pinion on the shaft of the disc 2. The pins 22 are secured to the register frame 24 while the frame is in a mounting jig whereby the pins are accurately positioned with reference to the point of engagement of the gear 33 with the pinion on the shaft of disc 2. The register elements are, therefore, inter-changeable so that, if one unit is damaged, a new unit may be inserted in the meter without necessitating any adjustment and without any possibility of affecting the accuracy of the meter.

The cover studs 5 project through the base 6 and are secured thereto by threaded nuts 36. It will be apparent, therefore, that the entire instrument is assembled upon the base 6 and cover studs 5. By unscrewing the wing nuts 8, the cover may be removed and the elements of the meter exposed. By unscrewing the nuts 36, the movement of the meter may be detached from the base 6 as a unit. By unscrewing the nuts 17, the laminated core member 1, with its windings, may be detached from the meter movement. The disc 2, the permanent magnets 3 and the register 4 are all carried on the shield 16 and may be separately removed for adjustment or repair, if desired, as described above.

As shown in Figs. 6 to 9 inclusive, the meter base 6 comprises a substantially cup-shaped pressed-steel member having a recess 39 in the upper portion thereof. The advantage of this conformation is that the rim of the base is of substantially U-shape in cross-section (as shown in Fig. 7) and an exceedingly strong and rigid construction is ensured. It is of the utmost importance that the base of an instrument of this kind be rigid and unchanging in shape because of the fact that the parts must be permanent in adjustment and, therefore, unvarying in their relative positions. On account of the high degree of accuracy of this type of instrument, even slight changes in the relation of the elements are not permissible, and heretofore, this has prevented the use of a light, pressed-metal base.

In the lower portion of the base is an integral terminal chamber 40 (see Figs. 1, 2 and 13). The terminals 13 extend through the base into said chamber, being insulated therefrom by insulating bushings 41 and washers 42, Fig. 2. A strap lead 43 is secured to the terminal 13, the inner end of the terminal being spun over at 44 to hold the terminal 13, the bushing 41 and the lead 43 in assembled relation. The lead 43 projects through the base into the recess 39 and is insulated from the base by insulation, such as layers of varnished cambric 45. The inner ends of the leads 43 are provided with binding screws 46 to which the windings of the instrument are attached. The rear of the terminal chamber 40 is closed by a plate 47 (see Figs. 10, 11 and 13), that is secured to the base 6 by screws that extend through the holes 48. The terminals 13 are enclosed in a cover-plate 50 (see Fig. 2) that is held in place by a wing nut 51 upon a threaded rod 52 secured to the base 6. If desired, the wing nut 51 may be sealed, in the usual manner, to prevent unauthorized persons from tampering with the meter connections.

It will be apparent that, by the described arrangement, access to the terminals may be obtained without removing the cover of the meter and that, even with the terminal cover-plate 50 of the terminals removed, the elements of the meter are still inclosed in a dust-proof casing.

As it is sometimes desirable to disconnect the shunt winding of a watthour meter for testing purposes, I have provided a test terminal 53 to facilitate such disconnection. As shown in Fig. 13, the test terminal 53 comprises a rotatable threaded member 54 engaging the connected shank 55 of a screw 56. The screw 56 is threaded through a strap 57 that projects into the recess 39 of the base (see Fig. 12) with the shunt winding. The lower end of the threaded member 54 engages a portion 58 of the terminal lead connected to the adjacent terminal 13. Therefore, an electrical connection is ordinarily provided through the screw 55 and the member 54 between the leads 57 and 58, thus connecting the shunt winding to the left-hand terminal 13. To disconnect the shunt winding from said terminal, it is only necessary to unscrew the member 54, thereby opening the circuit between said member and the lead 58. The member 54 is slotted at 59 so that it may be turned by means of a screw driver or similar tool.

While my invention is particularly applicable to a watthour meter of the induction type, such as that shown and described in the foregoing specification, certain features thereof may be applied to other instruments without material changes and, therefore, I desire that it shall not be limited in scope except by such restrictions as may be imposed by the prior art.

I claim as my invention:

1. An electrical measuring instrument comprising an electromagnet, a rotatable armature co-operating therewith, a shaft for said armature, a permanent magnet adjacent said armature, and a magnetic shield comprising a base and a rim, said shield disposed between said electro-magnet and said permanent magnet, said electromagnet and said armature shaft being secured to said shield adjacent the rim and base thereof.

2. A base for watthour meters comprising a one-piece sheet-steel member having a substantially U-shaped channel near its margin.

3. A base for watthour meters comprising a pressed-metal member of substantially cup-shape having a depression in the top portion thereof, and terminals mounted on the top portion of said member and provided with leads projecting into said depression.

4. A base for watthour meters comprising a pressed-metal member of substantially cup-shape having a depression in the top portion thereof, and terminal leads projecting through the flange formed by said depression.

5. An electrical measuring instrument comprising a base of inverted cup-shape, terminals mounted thereon, and a removable cover plate for said terminals inside of said base.

In testimony whereof, I have hereunto subscribed my name this 16th day of August, 1924.

WALTER G. MYLIUS.